No. 686,753. Patented Nov. 19, 1901.
O. OHLSSON.
CUSHIONED BEARING FOR CENTRIFUGAL APPARATUS.
(Application filed Mar. 19, 1901.)
(No Model.)

WITNESSES:
Geo. W. Naylor
Peter A. Ross

INVENTOR
Olof Ohlsson
BY
Henry Connett
ATTORNEY

UNITED STATES PATENT OFFICE.

OLOF OHLSSON, OF SÖDERTELJE, SWEDEN.

CUSHIONED BEARING FOR CENTRIFUGAL APPARATUS.

SPECIFICATION forming part of Letters Patent No. 686,753, dated November 19, 1901.

Application filed March 19, 1901. Serial No. 51,873. (No model.)

*To all whom it may concern:*

Be it known that I, OLOF OHLSSON, mechanical engineer, a citizen of the United States of America, residing at Södertelje, in the Kingdom of Sweden, have invented certain new and useful Improvements in Cushioned Bearings for Centrifugal Apparatus, (for which I have filed applications for patent in Sweden the 16th day of October, 1900, under No. 1,697/00; in Denmark the 17th day of November, 1900, under No. 1,241/00; in Finland the 27th day of November, 1900; in Germany the 28th day of November, 1900; in Russia the 24th day of November, [December 7,] 1900, under No. 12,689; in Austria the 26th day of November, 1900; in Hungary the 27th day of November, 1900, under No. 16,492; in France the 30th day of November, 1900, under No. 294,242, and in Belgium the 30th day of November, 1900, under No. 121,534,) of which the following is a specification, reference being had therein to the accompanying drawings.

This invention relates to that type of cushioned bearings for the upright shaft of centrifugal apparatus which is described in my Letters Patent No. 631,995, dated August 29, 1899. In said bearings an unattached coiled or volute spring is fitted between the inclosing box and the bearing proper or bushing, said spring bearing upon the box and frictionally embracing the bushing and, counting from its inner end, being coiled in the direction of rotation of the shaft. As stated in my said Letters Patent, the spring has for its purpose to serve as a yielding bearing for the bushing if the shaft should stick in the bushing and carry the latter around with it. Owing to the friction of the bushing on the spring the former will then tend to carry the inner whirl of the spring with it, and thus to expand the spring or partly unwind it, and the spring will thus serve as a yielding bearing for the bushing, thereby preventing a breakage of the same and the apparatus.

The object of the present invention is to provide means whereby the tension of said spring can be properly regulated and the shaft centralized, if necessary.

Another object of the invention is to compensate the wear of the spring.

For these purposes adjustable pins or screws are mounted in the inclosing box, against which pins or screws the outside of the uttermost whirl of the spring is bearing, as more clearly stated in the following description.

Figure 1:
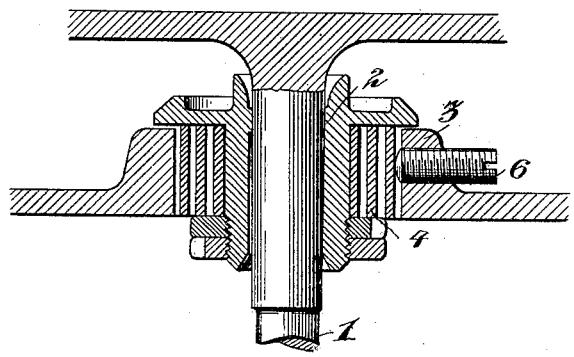
Figure 2:
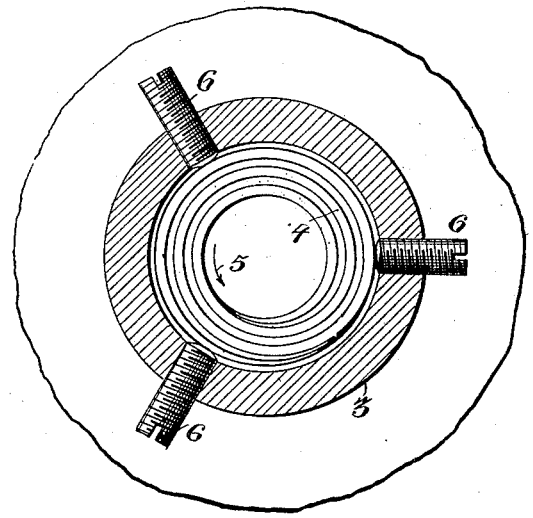

Figure 1 is a vertical axial section of the outer box, the bushing, and the spring, the shaft and one of said pins or screws being seen in elevation. Fig. 2 is a horizontal section of the outer box and a plan view of the spring and the adjustable pins or screws, the shaft and the bushing being not shown.

1 is the shaft of the centrifugal drum; 2, the bushing; 3, the surrounding box, and 4 the spring. In the drawings the spring 4 is wound or coiled in the direction indicated by the arrow 5, (seen in Fig. 2,) counting from its inner end, and the shaft is supposed to rotate in the direction of said arrow.

6 represents the above-mentioned adjustable pins or screws. In the drawings three pins or screws are shown; but evidently the number can be increased, if desired. The shown number has been found to be the most proper one, the pins or screws being mounted in the box 3 at equal distances apart about its periphery. The screws 6 extend through the wall of the outer box and can be adjusted from without. As seen from Fig. 2, the outside of the uttermost whirl of the spring is bearing upon the inner ends of said screws. By adjusting the screws 6 the tension of the spring can be properly regulated for holding the bushing 2. If said tension should decrease or the spring be worn, the necessary pressure of the spring upon the bushing readily can be restored by the tightening of the screws, so that a new spring need not be substituted for the worn one, as is the case when the spring is bearing directly upon the inside of the box 3. If the axis of the centrifugal drum and its shaft when rotating should not coincide with the central line of the spring—that is to say, if the centrifugal apparatus does not run quietly at a certain speed—it is only necessary to alter the position of one or more screws for centralizing the shaft. By the arrangement of said pins or screws lying in the same plane the shaft easily can occupy a somewhat-inclined position in the opening of the inclosing box when necessary for its centralization, the inner ends of the screws forming proper pivots for the spring when inclining with the bushing and the shaft. This is a great advantage when manufacturing bearings on a large scale, as the adjusting of said box is thereby avoided. The inner ends of the screws 6 are preferably made somewhat round, as shown in the drawings, for facilitating the said alteration of the position of the axis. By the described arrangement of adjustable pins or screws the position of the bushing and the shaft in relation to the inside of the box inclosing the spring can be altered within definite small necessary limits, as clearly understood from the above description.

Having now described my invention, what I claim as new, and desire to secure by Letters Patent, is—

1. In a journal-bearing, the combination with an upright shaft, the bushing of the bearing thereof, and the exterior box, of an unattached coil-spring between the said bushing and said box, said spring being exterior to the bushing and frictionally embracing the same, and three or more adjustable pins or screws mounted in the wall of said box with their inner ends forming supports for the outermost whirl of said spring, substantially as and for the purposes set forth.

2. In a journal-bearing for the shaft of a centrifugal apparatus, the combination with the said shaft, the bushing 2 of the bearing thereof, the outer box 3 embracing said bushing, and an unattached, coiled spring 4, frictionally embracing the bushing and situated between the latter and said box, of the three round-ended pins or screws 6 set in the wall of the box 3 with their rounded inner ends bearing on the outer whirl of said spring, substantially as and for the purposes set forth.

In witness whereof I have hereunto signed my name in the presence of two subscribing witnesses.

OLOF OHLSSON.

Witnesses:
ERNST SVANGVIST,
AUG SÖRENSEN.